Oct. 31, 1939.  F. R. SWANSON  2,178,441
MILLING MACHINE
Filed Jan. 19, 1937   4 Sheets-Sheet 1
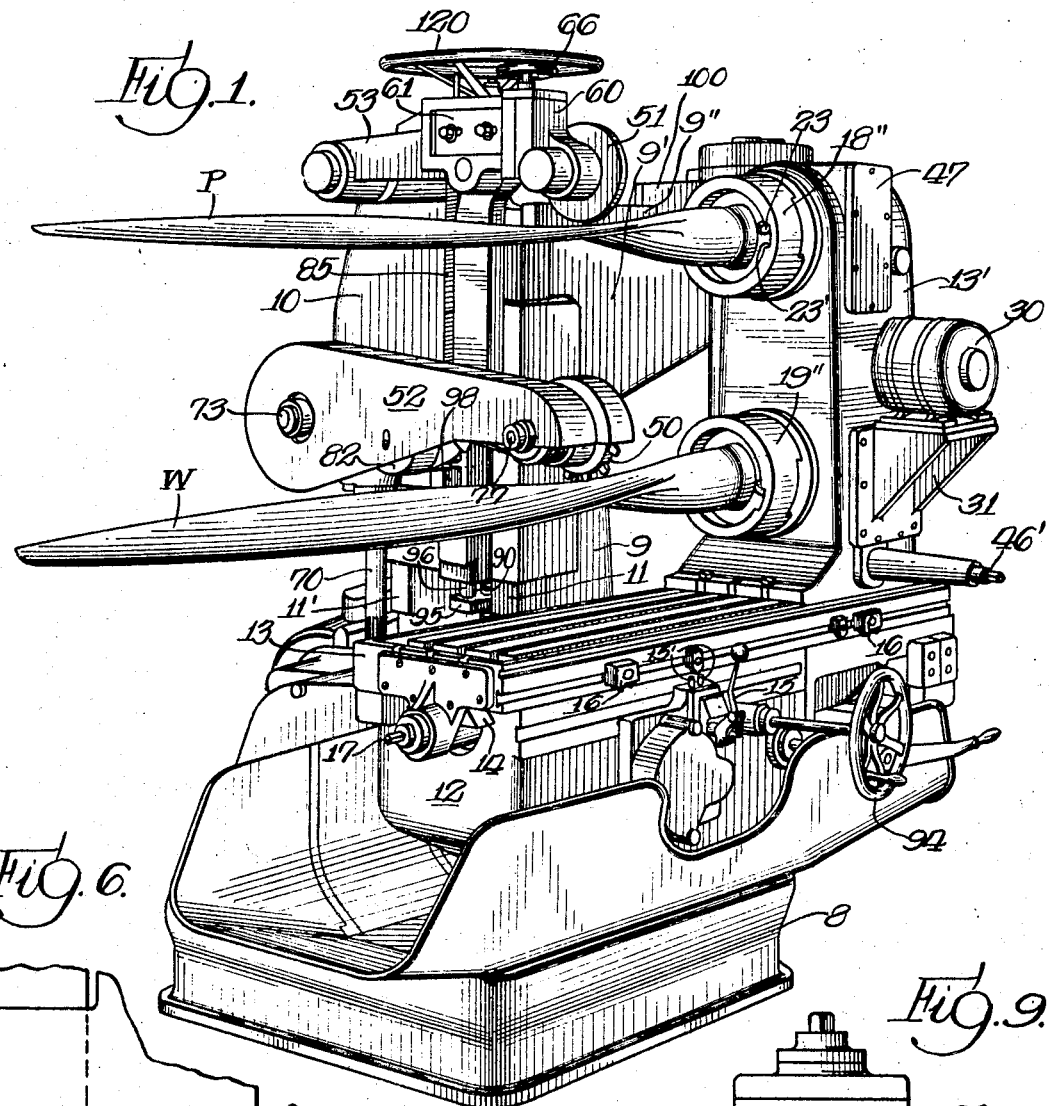
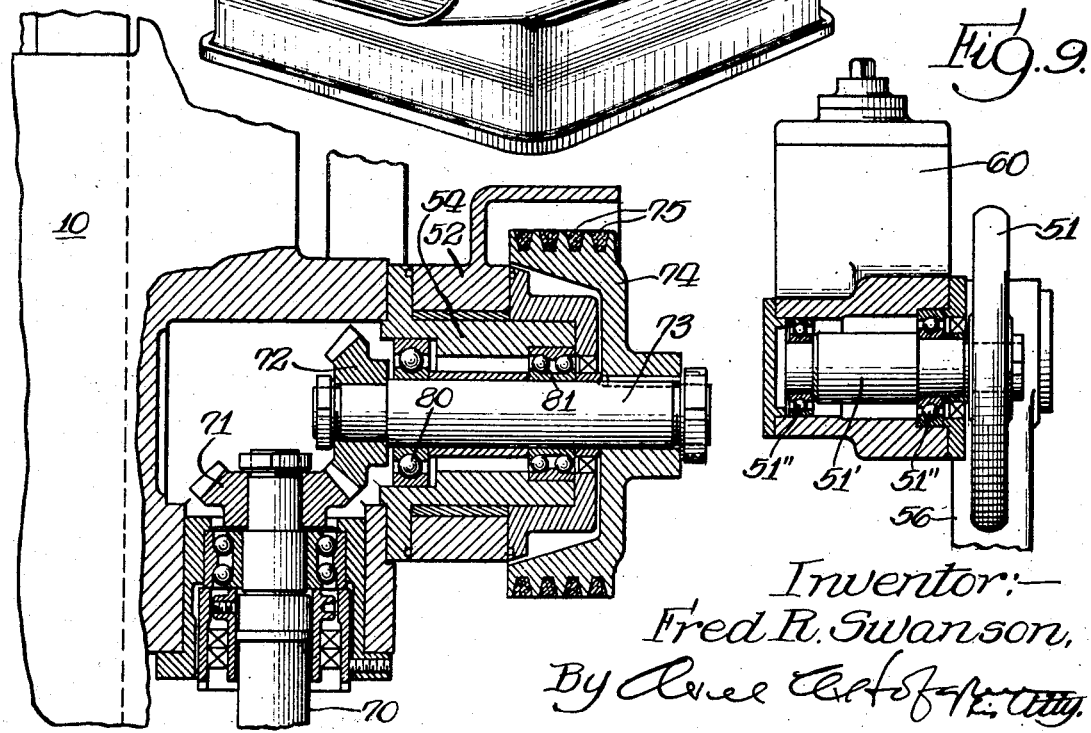
Inventor:—
Fred R. Swanson,

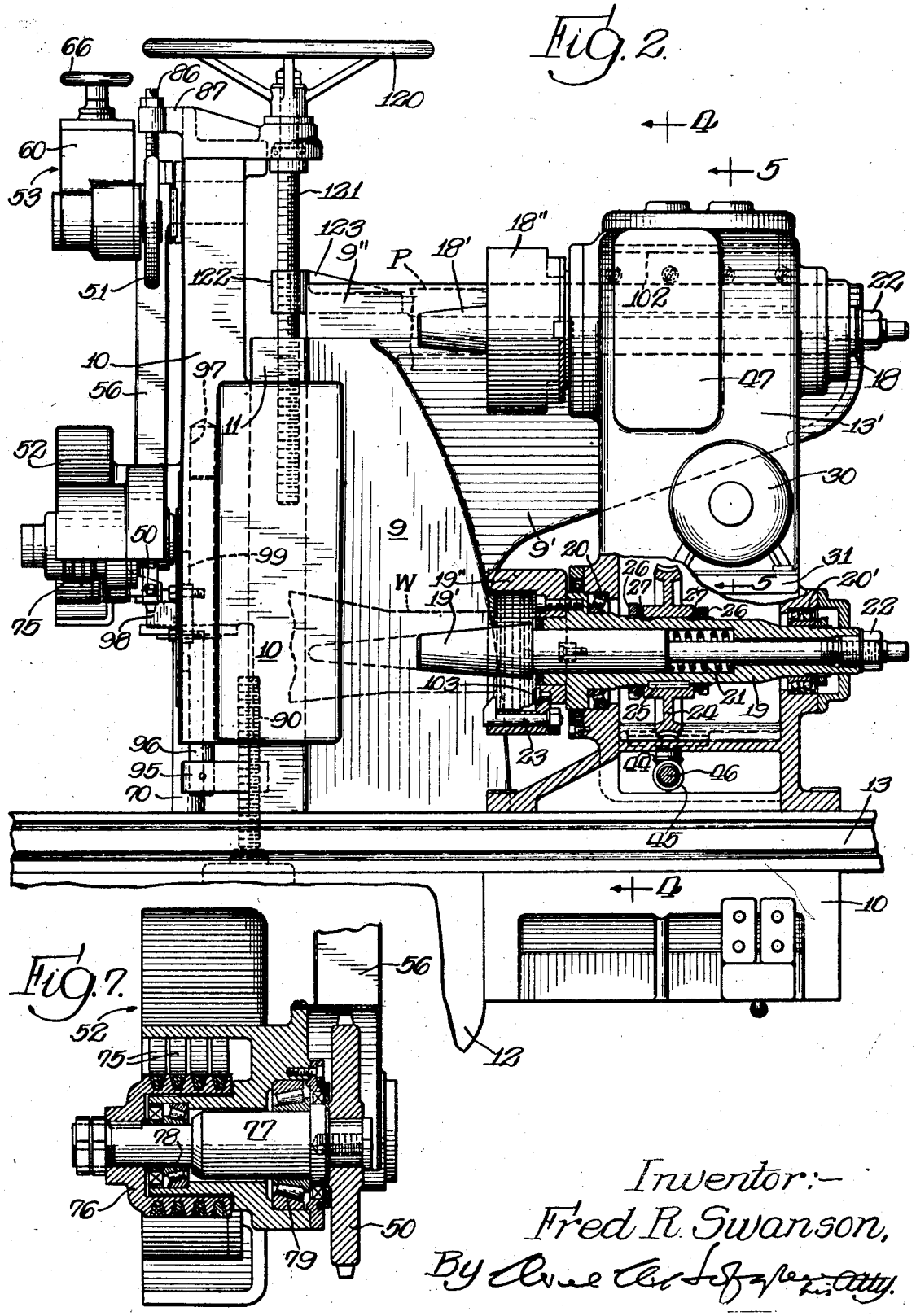

Oct. 31, 1939.                F. R. SWANSON                    2,178,441
                              MILLING MACHINE
                          Filed Jan. 19, 1937          4 Sheets—Sheet 3
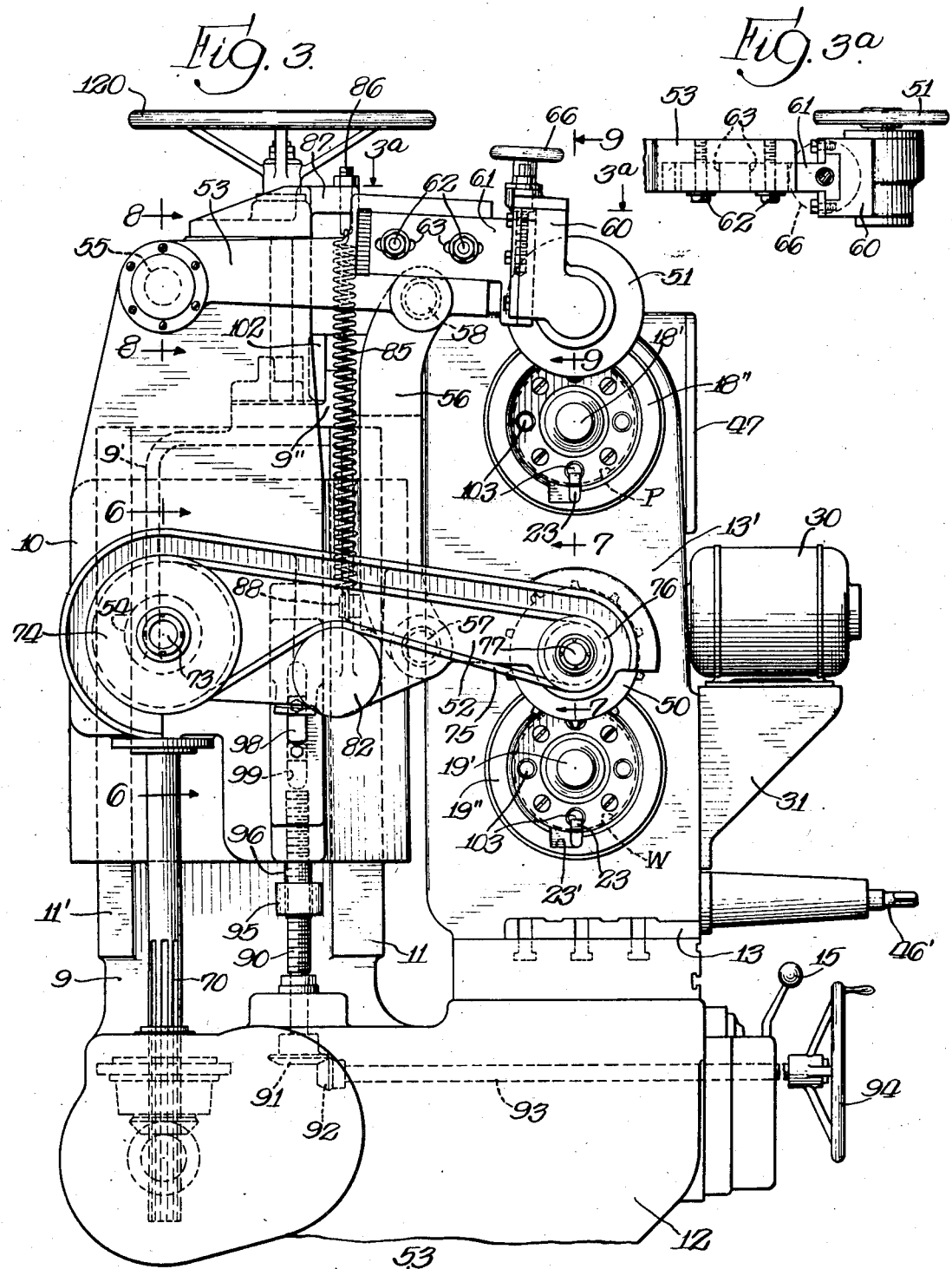
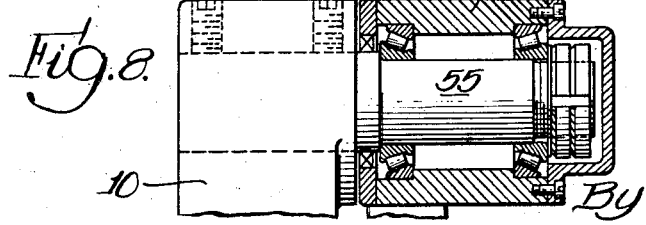
Inventor:—
Fred R. Swanson, Oct. 31, 1939.  F. R. SWANSON  2,178,441
MILLING MACHINE
Filed Jan. 19, 1937  4 Sheets-Sheet 4

Inventor:—
Fred R. Swanson,
By [signature] Atty.

Patented Oct. 31, 1939

2,178,441

UNITED STATES PATENT OFFICE 2,178,441

MILLING MACHINE

Fred R. Swanson, Rockford, Ill., assignor to Sundstrand Machine Tool Co., Rockford, Ill., a corporation of Illinois Application January 19, 1937, Serial No. 121,321

12 Claims. (Cl. 90—13.4)

This invention relates generally to milling machines and more particularly a contour milling machine adapted to form articles duplicating the form of a master pattern or templet.

It is the general object to provide a new and improved milling machine for processing articles or work pieces to conform with the contour of a master pattern.

A more particular object is to provide such a machine embodying many of the parts and the driving mechanism of a standard milling machine.

A further object is to provide a machine particularly adapted for milling propeller blades for aeroplane engines and to provide such a machine which is simple in construction and efficient in operation.

In pursuance of the foregoing objects I aim to provide a milling machine having a base, a column upstanding from the rear portion of the base, a cutter supporting head vertically adjustable on said column and having a pair of interconnected parallel arms pivotally mounted thereon on vertically spaced horizontal axes so as to extend forwardly from the head, one of the arms being provided with a templet or pattern follower and the other with a milling cutter, a work support slidably mounted on the forward portion of the base comprising a work table and a work supporting head upstanding from one end of the table, the head having a pair of work spindles rotatably mounted on two vertically spaced horizontal axes, one for carrying a templet or master pattern and the other for supporting a work blank, the cutter and work support being driven by the usual drive and feed mechanism of a milling machine, whereas the work spindles are driven in synchronism and at a low speed by a motor on the work supporting head. In operation, the work spindles are rotated with the pattern and the work blank secured thereto, while the work support moves laterally of the milling cutter, the follower on one of the pivotally mounted arms engaging the master pattern and thereby moving the milling cutter in a manner to reproduce on the work blank the contour of the master pattern.

Other objects and advantages will become readily apparent from the following detailed description taken in connection with the accompanying drawings, wherein:

Fig. 1 is a perspective view of a preferred form of the invention.

Fig. 2 is a fragmentary front elevation partly in section.

Fig. 3 is a fragmentary left-hand elevation.

Fig. 3a is a fragmentary plan section taken substantially along the line 3a—3a of Fig. 3.

Fig. 6 is a section approximately along the line 6—6 of Fig. 3.

Fig. 7 is a section approximately along the line 7—7 of Fig. 3.

Fig. 8 is a section taken substantially along the line 8—8 of Fig. 3.

Fig. 9 is a section approximately along the line 9—9 of Fig. 3.

Figure 4:
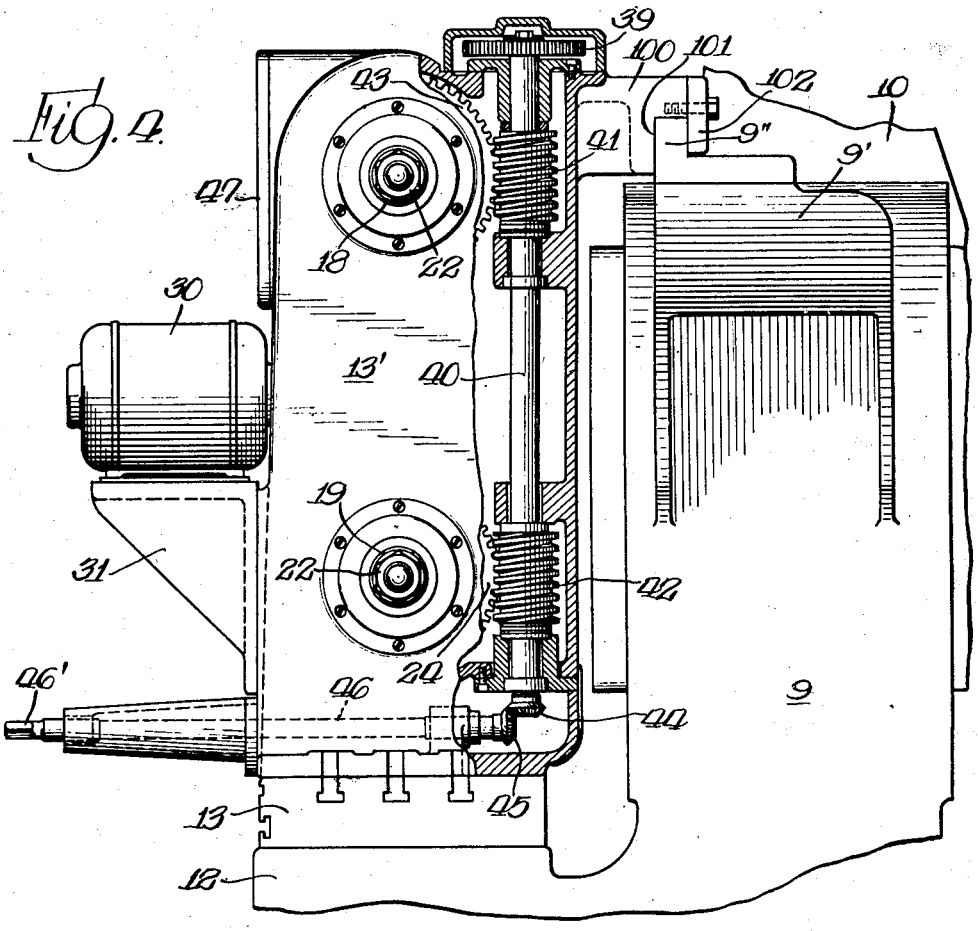
Fig. 4 is a fragmentary right-hand elevation partly in section along the line 4—4 of Fig. 2.

While the invention is shown in the drawings and hereinafter described as embodied in a milling machine particularly adapted for milling propeller blades, it is to be understood that the invention is not thereby limited to milling machines or such machines for milling propeller blades, it being contemplated that changes and modifications may be made by those skilled in the art without departing from the spirit and scope of the appended claims.

In the form shown for purposes of disclosure, the invention is embodied in a milling machine having a base 8, a column 9 upstanding from the rear portion of the base, a cutter supporting head 10 slidable vertically on the column 9 on ways 11 and 11' (Fig. 3), a work support mounted for transverse movement on the forward portion 12 of the base comprising the usual milling machine table 13 and a work head 13' upstanding from the right-hand end of the table and suitably bolted thereto, the table being slidable on ways 14 and operable by the usual feed mechanism permitting slow feed and rapid traverse in both directions, controllable by means including a single lever 15 and connected plungers 15' operable automatically by means of dogs 16 on the forward edge of the table. The table feed mechanism preferably includes a feed screw operable manually by means of a suitable handle on a squared end 17 for adjusting purposes.

The work head 13' (Figs. 1 and 4) is provided with a pair of vertically spaced horizontally extending spindles 18 and 19, the upper spindle 18 being provided with a pattern supporting arbor 18' and chuck 18" and the lower spindle 19 having a work blank supporting arbor 19' and chuck 19". As illustrated in Fig. 1, a pattern P is secured to the upper arbor and chuck, and a work blank W to the lower.

The work spindles 18 and 19 are preferably similar in construction and similarly mounted, the details of spindle 19 being illustrated in Fig. 2, wherein it is shown supported by a pair of anti-friction bearings 20 and 20'. The arbor 19' extends through the entire spindle, being urged forwardly by means of a coiled spring 21 and secured to the spindle by means of a nut device 22. The chuck 19'' has a plurality of work clamping devices 23 and the spindle proper carries a worm wheel 24 which is secured thereto by means of a key 25, lock nuts 26 and lock washers 27. The work spindles 18 and 19 are arranged to be driven in synchronism by an electric motor 30 mounted on a bracket 31 secured to the forward side of the head 13', the drive from the motor 30 to the spindles being illustrated most clearly in Figs. 4 and 5 as comprising a motor shaft 32 (Fig. 5), a coaxial shaft 33, a coupling 34 therebetween, bevel gears 35 and 36, a vertical shaft 37, pick-off gears 38 and 39 (Fig. 4), a downwardly extending vertical shaft 40, worms 41 and 42 secured to said vertical shaft and engaging a worm wheel 43 on the spindle 18 and the worm wheel 24 on the spindle 19, respectively. The gearing is such that during operation of the motor the work spindles are driven at a relatively low speed permitting the proper cutting operation to be performed on the work blank. Preferably a manual means is provided for rotating the work spindles, particularly for setting up purposes, such a means being herein illustrated in Fig. 4 as comprising a bevel gear 44 on the lower end of the vertical shaft 40 and a bevel gear 45 on a horizontal shaft 46 which extends forwardly from the work head 13' and has a squared end 46' for receiving a suitable operating handle. A removable cover plate 47 is provided on the upper portion of the work head 13' to give convenient access to the upper spindle, the motor supporting bracket 31 being removable to give access to the lower spindle.

In order to produce on the work piece W a contour duplicating that of the pattern P, the invention provides a rotatably mounted milling cutter 50 and a pattern follower 51, together with means for mounting said cutter and follower movably upon the head 10 in such a manner that the cutter moves in a path duplicating that of the follower. Thus in operation, with the table 13 feeding toward the right (Fig. 1) and the work spindles rotating the pattern P and work blank W at a relatively low speed, the cutter 50 and follower 51 move over the surfaces of the work blank and pattern in a form of spiral.

As illustrated herein, the means for mounting the cutter 50 and follower 51 movably upon the head 10 comprises a pivotally mounted arm 52 (Figs. 1 to 3) for the cutter and a pivotally mounted arm 53 for the follower. These arms are pivoted at their rear ends on pivot shafts 54 (Fig. 6) and 55 (Fig. 8), respectively, located on parallel horizontal axes, positioned one vertically below the other so that regardless of the position of the head 10 vertically on the ways 11 and 11' the pivotal axes 54 and 55 of the cutter and follower arms cooperate with the axes of the work spindles 18 and 19 to form a parallelogram. Furthermore, the arms 52 and 53 are preferably of the same length and are interconnected by means of a link 56 pivoted to the arm 52 by a pin 57 and to the arm 53 by a pin 58, so as to constrain the cutter supporting arm 52 to move in synchronism with the follower supporting arm 53. The cutter supporting arm is herein shown of fixed length, but means is preferably provided for adjusting the position of the follower 51 with respect to the axis of the cutter 50. Thus the follower 51 (Figs. 3, 3a and 9) is rotatably mounted on a member 60 which is slidable vertically on the forward end of a slide 61 adjustably mounted on the arm 53 for movement longitudinally thereof. Preferably, the follower 51 is fixed on one end of a stub shaft 51' which, as shown in Fig. 9, is rotatably supported in the member 60 by spaced bearings 51''. The slide 61 is secured to the arm 53 by a pair of clamping bolts 62 which pass through slots 63 in the slide to permit of adjustment of the slide on the arm when the bolts are loosened. The member 60 is preferably provided with a feed screw and nut connection to the slide 61 operable by means of a hand wheel 66.

In the preferred form of the invention illustrated in the drawings, it is contemplated that the cutter 50 will be driven from a motor located on the base of the machine, the drive to the spindle including (Fig. 3) a vertical shaft 70, bevel gears 71 and 72 (Fig. 6), a short shaft 73, a pulley 74, a plurality of V-belts 75 (Figs. 3, 6 and 7), a pulley 76 and a cutter supporting arbor 77 to which the pulley 76 is secured. The arbor 77 is rotatably mounted in the forward end of the arm 53 by means of antifriction bearings 78 and 79. Shaft 73 (Fig. 6) for the pulley 74 is rotatably mounted in antifriction bearings 80 and 81 supported in the hollow shaft 54 on which the arm 52 is pivotally mounted. Preferably, an idler pulley 82 is adjustably mounted in any preferred manner on the arm 52 to take up the slack in the V-belts 75.

To maintain the follower 51 and cutter 50 in contact with the pattern and work blank, respectively, during the cutting operation, the movable supporting structure for the cutter 50 and follower 51 is preferably urged downwardly solely by gravity, counter-balanced or resisted in part by a coiled spring 85 (Fig. 3) secured at its upper end to an adjustable anchoring bolt 86 mounted in a lug 87 projecting from the upper portion of the head 10, and at its lower end to a lug 88 on the arm 52. Means is preferably provided for limiting the downward swinging movement of the arms 52 and 53 and for raising the arms away from the work and pattern while a new work piece is being inserted in the chuck 19''. As illustrated most clearly in Fig. 3, such a means comprises a vertically positioned screw 90 rotatably mounted in the base 8 and operable through bevel gears 91 and 92, a horizontal shaft 93 and a hand wheel 94. The screw 90 extends upwardly into screw threaded engagement with an arm 95 fixed to and projecting laterally from the lower end of a vertically slidable rod 96. The rod 96 is mounted in bore 97 (Fig. 2) and has an arm 98 projecting through a vertical slot 99 in the head so as to underlie and limit the downward movement of the arm 52. Since the slot 99 is of a vertical extent proportioned in accordance with the vertical range of movement of the head 10, the head 10 may be adjusted independently of the position or actuation of the abutment arm 98.

Figure 5:
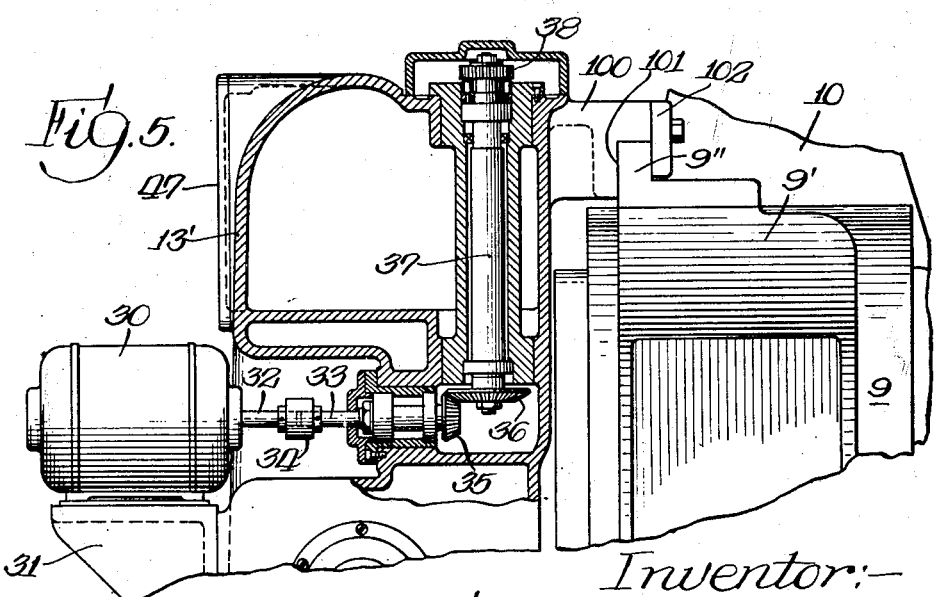
Fig. 5 is a fragmentary right-hand elevation partly in section along the line 5—5 of Fig. 2.

In order that the work head 13' may be properly positioned laterally at all times, the invention preferably provides guiding means for the upper end of the head 13', and to this end a rigid extension 9' is provided on the column 9, which as shown in Figs. 1 and 2 extends from the right hand side of the column parallel to the path of movement of the table 13. On the top of the extension 9', an elongated L-shaped way 9'' is secured, as shown in Figs. 1, 4 and 5, to provide a guideway, and from the upper end of the head 13' an arm 100 extends toward and over the way 9" to engage the way slidably on the adjacent side by a surface 101 and on the opposite side with a surface provided by a bolted plate 102.

The head 10 may be raised or lowered by means of a hand wheel 120 (Figs. 1 to 3) secured to a vertical feed screw 121 which is rotatably mounted (against longitudinal movement) in the bracket 87 on the head 10 and engages a nut 122 secured to a bracket 123 on the column 9.

As herein illustrated, the machine is set up for milling only the complex surface of the propeller blade adjacent to the large or inner end, and contemplates the working of the relatively thin outer ends of the blades by other means. In setting up the machine, the cutter 50 and the follower 51 are elevated or raised to out-of-the-way positions by actuation of the hand wheel 94. The arbor 18' is then withdrawn by its nut device 22, and the clamping devices 23 of the chuck 18" are released and swung outwardly into the clearance space 23' (Figs. 1 and 3) to permit insertion of the flanged end of pattern P into the chuck 18". When the clamps 23 are tightened against the flange of the pattern P, the inner face of the pattern is drawn firmly against a plurality of positioning pins 103 (Figs. 2 and 3), so that the axis of the pattern P coincides with the axis of the supporting spindle 18. The nut 22 of the spindle 18 is then released, and the spring 21 forces the tapered arbor portion 18' of the spindle into a correspondingly tapered axial socket in the end of the pattern.

The mounting of the work W on the spindle 19 is accomplished in a similar manner, making certain, of course, that the roughly formed flat portion of the outer end of the blade of the work W is rotatively positioned substantially parallel to the corresponding flat portion of the pattern P. It will be noted that the positioning pins 103 of the two chucks are located in a common plane, so that a plane perpendicular to the spindle axes and passing through any selected point in the pattern will pass through the corresponding point in the work W.

The table 13 is then shifted to the left, by manipulation of the control lever 15, until the cutter 50 is located over a finished cylindrical portion of the shank of the work W, after which the motor 30 is started so as to initiate the slow rotative movement of the pattern P and the work W. The rotation of the cutter 50 is then initiated and the arms 52 and 53 are lowered gradually to their operative positions by actuation of the hand wheel 94.

The vertical distance between the lower extremity of the cutter 50 and the lower edge of the follower 51 is, of course, important in producing finished work of the same size as the pattern P, it being necessary, in attaining correspondence of size, to have this distance equal to the vertical spacing of the axes of the spindles 18 and 19; and, therefore, it is advisable to check at this point the adjustment of the hand wheel 66 before the actual milling operation.

It will be noted that the follower 51 is disk-like in form and is of substantially the same size as the cutter 50, so the vertical movement of the follower, as it rolls in contact with the moving surface of the pattern W, will produce movement of the cutter 50 which will result in the production of a corresponding surface on the work W.

When the cutter and the follower are properly related by adjustment of the hand wheel 66, and the follower is lowered onto the cylindrical shank of the pattern P, no cutting results on the finished cylindrical shank of the work W, this shank having been sized and finished in a previous operation. The movement of the table 13 is then initiated to the right (Figs. 1 and 2) at a relative slow feed speed by actuation of the control lever 15, so that the cutter mills around the work W in a generally spiral path to reproduce on the work W the complex surface of pattern P. When the desired length of the work has been milled, the cutter is elevated by means of the hand wheel 94 and the various parts of the machine are stopped so that the finished work may be removed and replaced.

I claim as my invention:

1. A machine tool having, in combination, a base, a column uprising from said base, a table slidably mounted on said base in front of said column, a work support secured to said table, a pair of slow speed power driven spindles rotatably mounted on parallel axes in said work support, means for driving said spindles in synchronism, a cutter supporting head slidably vertically on said column, a pair of individual arms pivotally mounted on said head on vertically spaced axes parallel to said spindle axes, a cutter rotatably mounted on the free end of one of said arms, a pattern follower mounted on the free end of the other arm, means connecting said arms so as to cause them to move in unison under control of the pattern follower, and means for driving said cutter.

2. A milling machine of the character disclosed comprising, in combination, a base and a frame having a column uprising from said base, a table reciprocably mounted on said base in front of said column, an upstanding work support secured to said table, a pair of slow speed power driven spindles rotatably mounted on said work support on axes parallel to each other and to the path of movement of said table, one of said spindles being adapted to support an elongated pattern in axial projecting relation thereto, and the other spindle being adapted to support an elongated work piece in axially projecting relation thereto in such a position that a plane located at right angles to said axes will pass through corresponding points in the pattern and the work piece, means for driving said spindles in synchronism, a pair of arms pivotally mounted on said frame on vertically spaced axes parallel to but located rearwardly at said spindle axes, a power driven cutter rotatably mounted on the free end of one of said arms to position to perform a milling cut spirally about a work piece as the work piece is rotated slowly during slow longitudinal movement of said table, a pattern follower mounted on the free end of the other arm, means connecting said arms so as to cause them to move in unison, means for moving said table at a slow speed during the milling operation, and means for adjusting said follower transversely of its supporting arm in a plane perpendicular to said axes.

3. A machine tool having, in combination, a reciprocatory work support, a pair of work supporting spindles rotatably mounted on spaced parallel axes on said support, a cutter support pivotally mounted on an axis parallel to but spaced laterally from the plane of the axes of said spindles, a narrow edge-toothed cutter of disk-like form rotatably mounted on said cutter support for operation on a work blank mounted on one of said work spindles, means for actuating said cutter support to cause the cutter to mill the work blank to conform with the shape of a pattern mounted on the other work spindle, said means comprising a follower support pivotally mounted on an axis parallel to and forming one corner of a parallelogram with the cutter support axis and the work spindle axes, a disk-like follower mounted on said follower support for free rotation on an axis parallel to said spindle axes, means for adjusting the position of said follower upon said follower support in a direction radially of the axis of the support and in a direction perpendicular thereto, and a link connecting said follower support to said cutter support.

4. A milling machine having, in combination, a base, a column uprising from said base, a table reciprocably mounted on said base in front of said column, a work support secured to said table, a pair of slow speed power driven spindles rotatably mounted on said work support on axes parallel to each other and to the path of movement of said table, one of said spindles constituting a support for an elongated pattern, and the other spindle constituting a support for an elongated work piece, means for driving said spindles in synchronism, a cutter supporting head adjustable vertically on said column, a pair of arms pivotally mounted on said head on vertically spaced axes parallel to said spindle axes, a power driven cutter rotatably mounted on the free end of one of said arms in position to perform a milling cut spirally about a work piece as the work piece is rotated slowly during longitudinal movement of said table, a pattern follower mounted on the free end of the other arm, means connecting said arms so as to cause them to move in unison, and means for moving said table at a slow speed during the milling operation.

5. A machine tool comprising, in combination, a machine frame having a base and a column uprising from said base, a table reciprocable on said base in front of said column, an upstanding work support secured to said table, a pair of spindles rotatably mounted on horizontal, vertically spaced axes on said work support, means for driving said spindles in synchronism, a cutter supporting head on said column, a pair of arms pivotally mounted on said head on vertically spaced axes parallel to said spindle axes, a cutter rotatably mounted on the free end of one of said arms, a pattern follower mounted on the free end of the other arm, means connecting said arms so as to cause them to move in unison, said cutter and said follower being adapted respectively to engage the upper surfaces of a work piece and a pattern mounted on said spindles, and said cutter and said follower being urged by gravity toward operative engagement with the work and the pattern respectively, and means operable from the forward side of said base for raising said arms to retract said follower and said cutter from axes of said spindles.

6. A machine of the character described having, in combination, a base and a column uprising from said base, a table reciprocable on said base in front of said column, an upstanding work support secured to said table, a pair of spindles rotatably mounted on parallel horizontal, vertically spaced axes on said work support, means for driving said spindles in synchronism, a cutter supporting head on said column, a pair of arms pivotally mounted on said head on vertically spaced axes parallel to said spindle axes, a cutter rotatably mounted on the free end of one of said arms, a pattern follower mounted adjacent to the free end of the other arm, means connecting said arms so as to cause them to move in unison, said cutter and said follower being adapted respectively to engage the upper surfaces of a work piece and a pattern mounted on said spindles, and said cutter and said follower being urged by gravity toward operative engagement with the work and the pattern respectively, means for driving said cutter, means for moving said table slowly during a milling operation, and means counterbalancing a portion of the weight of said arms.

7. A milling machine having, in combination, a base and a column uprising from said base, a table reciprocable on said base in front of said column, an upstanding work support secured to said table, a pair of spindles rotatably mounted on parallel axes in said work support, means for driving said spindles in synchronism at slow speed, a cutter supporting head on said column, a pair of arms pivotally mounted on said head on vertically spaced axes parallel to said spindle axes, a cutter rotatably mounted on the free end of one of said arms, a pattern follower mounted on the free end of the other arm, means connecting said arms so as to cause them to move in unison, said cutter and said follower being adapted respectively to engage the upper surfaces of a work piece and a pattern mounted on said spindles, and said cutter and said follower being urged by gravity toward operative engagement with the work and the pattern respectively, means for driving said cutter, and means for moving said table slowly during a milling operation.

8. A milling machine of the character described comprising, in combination, a machine frame having a base and a column uprising from said base, a table reciprocably mounted on said base in front of said column, an upstanding work support secured to said table, a pair of slow speed power driven spindles rotatably mounted on said work support one above the other and on axes parallel to each other and to the path of movement of said table, the upper of said spindles constituting a support for an elongated pattern, and the lower spindle constituting a support for an elongated work piece conveniently positioned for loading and unloading, means for driving said spindles in sychronism, said means having a motor mounted on the front of said upstanding work support and a gear drive to said spindles including pick-off gears located at the top of said work support, a pair of arms pivotally mounted on said machine frame on vertically spaced axes parallel to but spaced rearwardly from said spindle axes, a power driven cutter rotatably mounted on the free end of one of said arms in position to perform a milling cut spirally about a work piece as the work piece is rotated slowly during longitudinal movement of said table, a pattern follower mounted on the free end of the other arm, means connecting said arms so as to cause them to move in unison and means for advancing said table at a slow speed during the milling operation.

9. A milling machine of the character described comprising, in combination, a machine frame having a base and a column uprising from said base, a table reciprocably mounted on said base in front of said column, an upstanding work support secured to said table, means on the column forming a guide and means on the support cooperable with the guide to provide lateral support for the table, a pair of slow speed power driven spindles rotatably mounted on said work support on axes parallel to each other and to the path of movement of said table, one of said spindles constituting a support for an elongated pattern, and the other spindle constituting a support for an elongated work piece, means for driving said spindles in sychronism, said means including a motor carried by said table, a pair of arms pivotally mounted on said machine frame on horizontal axes spaced a distance eqoal substantially to the distance between said spindle axes and parallel to but spaced rearwardly from said spindle axes, a rotatable cutter mounted on the free end of one of said arms in position to perform a milling cut spirally about a work piece as the work piece is rotated slowly during longitudinal movement of said table, means mounted on said base for rotating said cutter, a follower mounted on the free end of the other arm, means connecting said arms so as to cause them to move in unison, and means for advancing said table at a slow speed during the milling operation.

10. A milling machine of the character described comprising, in combination, a machine frame having a base with a column uprising from said base, a table reciprocably mounted on said base in front of said column, an upstanding work support secured to said table, a pair of slow speed power driven spindles rotatably mounted on said work support on axes parallel to each other and to the path of movement of said table, one of said spindles constituting a support for an elongated pattern, and the other spindle constituting a support for an elongated work piece, means for driving said spindles in synchronism, said means having a motor mounted on the front of said upstanding work support and a gear drive to said spindles including pick-off gears located at the top of said work support, a pair of arms pivotally mounted on said machine frame on vertically spaced axes parallel to but spaced rearwardly from said spindle axes, a power driven cutter rotatably mounted on the free end of one of said arms in position to perform a milling cut spirally about a work piece as the work piece is rotated slowly during longitudinal movement of said table, a pattern follower mounted on the free end of the other arm, means connecting said arms so as to cause them to move in unison, means for advancing said table at a slow speed during the milling operation, and manually operable means for rotatively adjusting said spindles during the loading of the spindles, said adjusting means having an operating element located on forward side of work support.

11. A milling machine of the character described having, in combination, a machine frame having a base and a column uprising from said base, a table reciprocable on said base in front of said column, an upstanding work support secured to said table, a pair of vertically spaced spindles rotatably mounted on parallel axes in said work support, means for driving said spindles in synchronism at slow speed, a pair of arms pivotally mounted on said machine frame on vertically spaced axes parallel to but spaced horizontally from said spindle axes, a cutter rotatably mounted on the free end of one of said arms, a follower mounted on the free end of the other arm, means connecting said arms so as to cause them to move in unison, means for driving said cutter, means for moving said table slowly during a milling operation, a rigid guideway mounted on said machine frame and having oppositely facing elongated guide surfaces, one facing forwardly and the other rearwardly and being parallel to the path of movement of said table and adjacent to the top of said upstanding work support, and means rigid with said work support and slidably engaging said guide surfaces.

12. A milling machine having, in combination, a base, a column uprising from said base, a table slidably mounted on said base in front of said column, an upstanding work support secured to said table, a pair of slow speed power driven spindles rotatably mounted on parallel axes on said work support, means for driving said spindles in synchronism, a cutter supporting head on said column, a pair of arms pivotally mounted on said head on vertically spaced axes parallel to said spindle axes, a cutter rotatably mounted on the free end of one of said arms, a pattern follower mounted on the free end of the other arm, means connecting said arms so as to cause them to move in unison, means for driving said cutter, means for moving said table slowly during a milling operation, a rigid guideway projecting from said column and having oppositely facing elongated guide surfaces, one facing forwardly and the other rearwardly and being parallel to the path of movement of said table and adjacent to the top of said upstanding work support, and means rigid with said work support and slidably engaging said guide surfaces.

FRED R. SWANSON.